United States Patent
Stephens et al.

[11] Patent Number: 5,953,080
[45] Date of Patent: *Sep. 14, 1999

[54] STANDBY CIRCUIT FOR A TELEVISION

[75] Inventors: Joseph Curtis Stephens, Carmel, Ind.; Kenneth Jay Helfrich, Crystal Lake, Ill.

[73] Assignee: Thomson Consumer Electronics, Inc., Indianapolis, Ind.

[*] Notice: This patent issued on a continued prosecution application filed under 37 CFR 1.53(d), and is subject to the twenty year patent term provisions of 35 U.S.C. 154(a)(2).

[21] Appl. No.: 08/929,205

[22] Filed: Sep. 9, 1997

[51] Int. Cl.$^6$ ........................................... H04N 5/63
[52] U.S. Cl. ........................ 348/730; 348/706; 348/707
[58] Field of Search ...................... 348/730, 706, 348/707, 377–382, 327, 805; H04N 5/63

[56] References Cited

U.S. PATENT DOCUMENTS

| | | | |
|---|---|---|---|
| 4,858,006 | 8/1989 | Suzuki et al. | 348/189 |
| 5,036,261 | 7/1991 | Testin | 348/730 |
| 5,327,172 | 7/1994 | Tan | 348/378 |

*Primary Examiner*—John K. Peng
*Assistant Examiner*—Linus H. Lo
*Attorney, Agent, or Firm*—Joseph S. Tripoli; Joseph J. Laks; Francis A. Davenport

[57] ABSTRACT

A switching circuit for a television set is coupled to the television microprocessor and associated power supply on one end, and to the standby power supply portion of a T-chip on the other end. The T-chip is not powered during the "off" times of the television thus reducing the power consumption of the circuit. The switching circuit operates to enable the standby power supply of the T-chip upon receipt by the microprocessor of an "on" command after which the T-chip will enable the horizontal drive circuits upon the receipt of a further "on" command.

6 Claims, 2 Drawing Sheets

STANDBY CIRCUIT FOR A TELEVISION

BACKGROUND OF THE INVENTION a. Field of the Invention

The present invention relates to power control circuits for televisions and, more particularly, to a standby power circuit for televisions.

b. Description of the Prior Art

In today's digitally controlled television sets, it is generally desirable to maintain a small amount of power to some of the ICs, e.g. to preserve memory, and IR remote capabilities. It is preferable that standby power be approximately 5 watts and, more preferably approximately 3 watts.

While there are various types of circuits used in televisions, one type is known as the "hot" type chassis. "Hot" type television chassises do not require isolation in the off-the-line supplies, as isolation is achieved at the antenna input in this type of product. Thus, standby power is achieved by deriving power directly from the line (½ wave or full-wave bridge) and dropping the level through an impedance to the appropriate level needed by the standby circuits. However, this method is inefficient.

In a bus-controlled television system, a microprocessor sends an "on" command via a "T-bus" to a bus-controlled television IC (also known as a T-chip), such as an LA7610 manufactured by Sanyo. The T-chip performs many processing functions needed for color television including e.g. IF, chroma, luma, audio, horizontal and vertical. Bus receivers needed to decode the "on" command must be supplied by a power source that is not dependent on the horizontal circuits for power, since the horizontal circuits are not powered until necessary. There is also the need to power the microprocessor and IR receiver. Such circuits typically use a 7.6 volt standby circuit of the T-chip. However, running all of these circuits off of the standby power of the T-chip takes a current of approximately fifty milliamps resulting in a standby power of nearly ten watts. Since the T-chip is responsible for about half of this power drain in order to power the 7.6 volt standby circuit, it is desirable to switch off the power to the T-chip until the power is needed, i.e. a short time before the horizontal circuits are to be engaged.

It is thus an object of the present invention to provide standby power for a bus controlled television set that is not derived from the T-chip.

It is another object of the present invention to provide a switching circuit for a the T-chip within a bus controlled television set.

It is further an object of the present invention to provide a switching circuit for a T-chip and standby power system within a bus controlled television set.

SUMMARY OF THE INVENTION

In keeping with the above, the present invention is a switched standby supply circuit (or pre-run supply circuit) for enabling the T-chip utilizing the microprocessor power supply. When the microprocessor receives an "on" command the power source for the standby power supply of the T-chip is enabled, then, after a stabilizing time period, an "on" command to the T-chip is delivered to start the horizontal drive circuits.

In one form, the power source for the T-chip standby power supply comes from a dedicated series pass power supply such as a transistor. An unregulated power supply with a voltage limiter, such as a zener diode, limits the voltage at the collector of the transistor when current is being drawn therethrough.

BRIEF DESCRIPTION OF THE DRAWINGS

For a fuller understanding of the nature and advantages of the present invention, reference should be had to the following detailed description taken in conjunction with the accompanying drawings, in which.

Similar reference characters refer to similar parts throughout the several drawings, unless otherwise noted.

DETAILED DESCRIPTION OF THE PREFERRED EMBODIMENT

Figure 1:
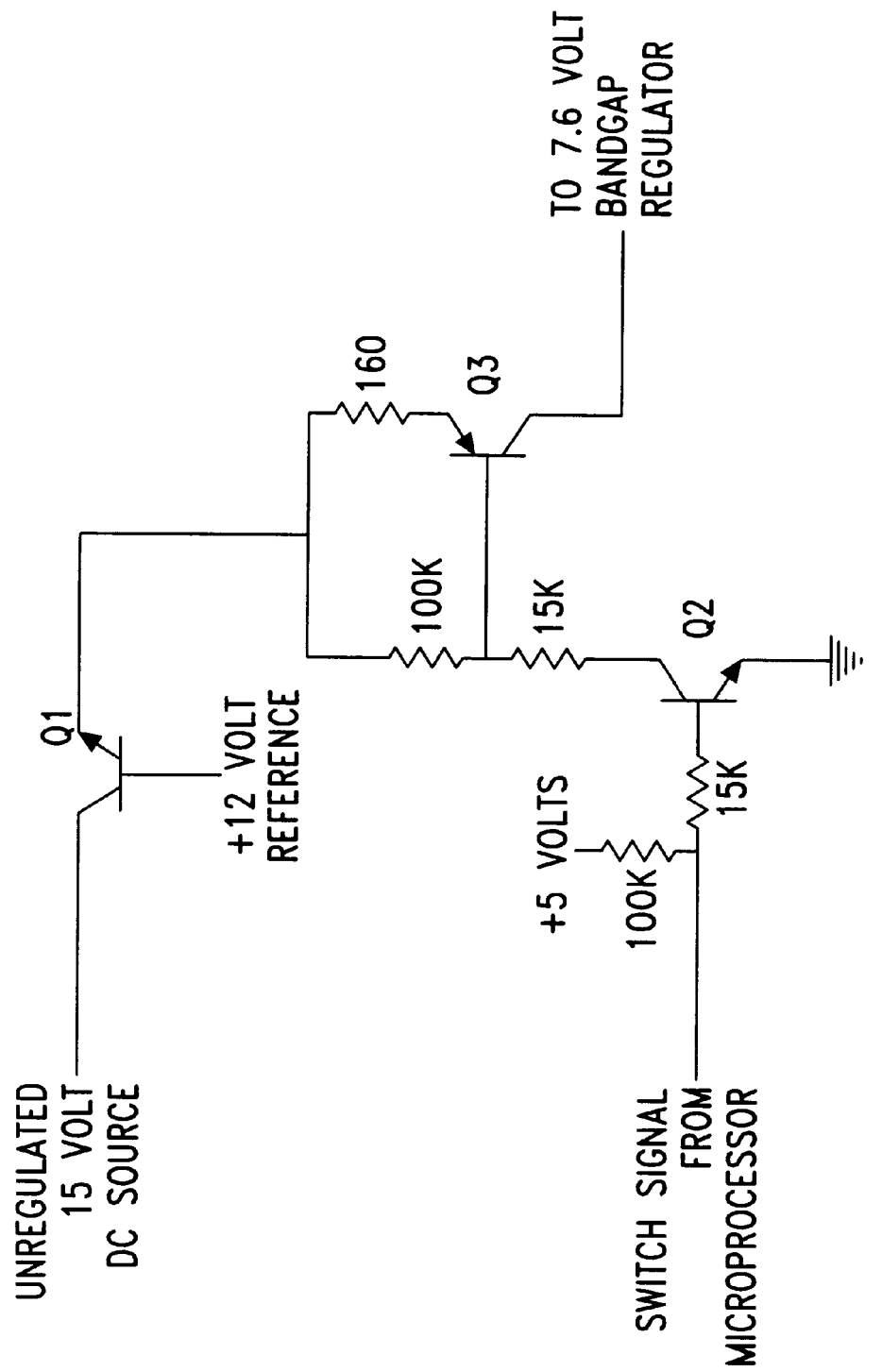
FIG. 1 is an electrical circuit schematic of an embodiment of the present invention.

Referring now to FIG. 1, there is depicted an electrical circuit generally designated 10. The circuit 10 is a switching circuit for enabling the bandgap shunt regulator of a T-chip (not shown), such as a T-4 chip. The circuit includes an npn transistor Q1 whose base is coupled to a +12 volt reference voltage and whose collector is coupled to an unregulated +15 volt DC source for providing a reference voltage to the bandgap regulator of the T-chip when appropriate. The output from the emitter of the transistor Q1 is fed into a voltage divider having a 160 ohm resistor 18 leg and a 100K ohm resistor 20 leg. The 160 ohm resistor 18 is coupled to the emitter of a pnp transistor Q3 while the 100K ohm resistor 20 is coupled to the base of the transistor Q3.

Another npn transistor Q2 has its base coupled to an input line 16 from which is received an "on" command (switch signal) from the microprocessor (not shown). Disposed between the transistor Q2 base and the switch signal source, is a 15K ohm resistor 26 and a 100K ohm resistor 24 which is coupled to a +5 volt reference voltage. The emitter of the transistor Q2 is coupled to ground, while the collector of the transistor Q2 is coupled to a 15K ohm resistor 22. The resistor 22, like resistor 20, is coupled to the base of the transistor Q3. The collector of the transistor Q3 is coupled to the bandgap regulator of the T-chip via line 12.

The operation of the circuit 10 of FIG. 1 is as follows. An open collector output switch signal 16 from the microprocessor (not shown) provides a high impedance state to the base of the transistor Q2 causing the transistor Q2 to be saturated on which in turn saturates transistor Q3. Transistor Q3 thus turns on. When transistor Q3 turns on, current is supplied via line 12 to the bandgap regulator portion of the T-chip (not shown) to allow the T-chip to receive signals from across the bus. The T-chip will then allow power to the horizontal drive circuits once a power "on" command is received.

When the switch signal 16 from the microprocessor is in the low impedance state, the base drive for transistor Q2 flows into the microprocessor pin which biases the transistor Q2 off. Transistor Q3 is therefore turned off by the 100K Ohm pull up resistor 20.

Thus, when the television set is off the T-chip is not active, either in enabling the horizontal drive circuits or in supplying standby power to the various components. In this manner the power drain associated with the T-chip is not present, reducing the overall power consumption during the time that the television is off while still providing the necessary standby power to the appropriate circuits.

Figure 2:
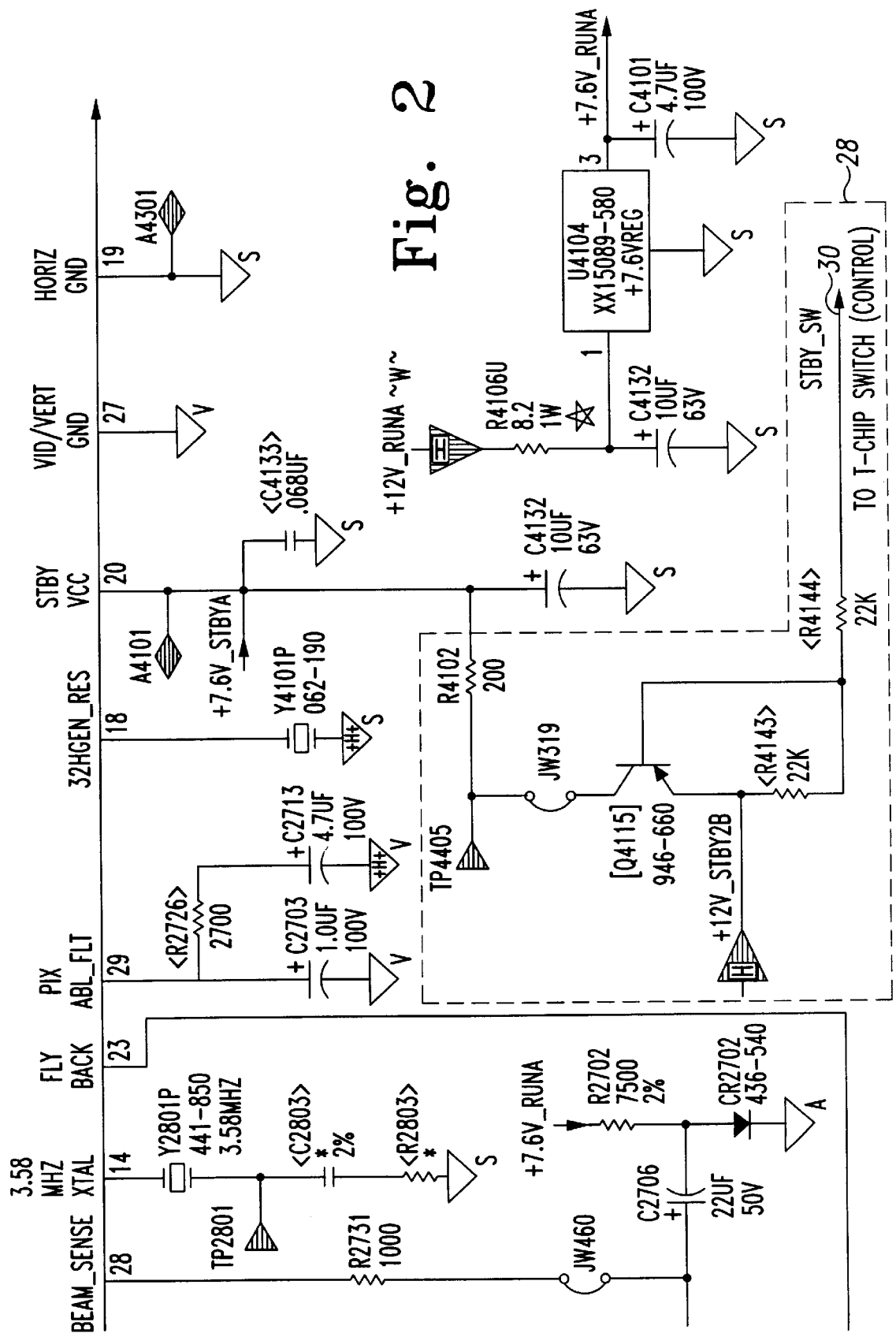
FIG. 2 is an electrical circuit schematic of a second embodiment of the present invention.

Referring now to the schematic of FIG. 2, there is shown an alternative embodiment of the present invention implemented within a television circuit. The circuitry shown in the schematic is only a partial representation of a circuit required to run a television. Within the circuit is a switching circuit 28 consisting essentially of a pnp transistor Q4115 having its emitter coupled to the +12 volt microprocessor supply and its collector coupled through a 200 ohm resistor R4102 to a +7.6 volt reference voltage and to the bandgap regulator of the T-4 chip, designated STBY VCC 20. The base of the transistor Q4115 is connected to a 22K ohm resistor R4143 which in turn is coupled to the emitter and to one end of a 22K ohm resistor R4144. The other end of the 22K Ohm resistor, R4144, is coupled to a line 30 connected to the standby output of the microprocessor (not shown), designated STBY-SW TO T-CHIP SWITCH (CONTROL).

In operation, when the transistor Q4115 receives an on signal from the microprocessor, via line 30, that is the base of the transistor Q4115 goes low, the +12 volt supply is coupled to the STBY VCC of the T-chip. This enables T-chip standby power and prepares the T-chip for the "on" command to enable the horizontal drive circuits.

At shutdown, the microprocessor, via line 30, STBY-SW TO T-CHIP switch (control), causes the base of the transistor Q4115 to go high, shutting off the +12 volt supply to the T-chip, that is the +12 volt supply is open-circuited from the STBY VCC 20.

In describing the present invention, reference has been made to the preferred embodiment. However, those skilled in the art and familiar with the disclosure of the invention may recognize additions, deletions, substitutions or other modifications which would fall within the purview of the present invention as described hereinabove and in the appended claims.

What is claimed is:

1. In a microprocessor controlled, bus type television set, a circuit for enabling a standby power supply of a bus controlled I.C. of the television set in response to an "on TV" command received by the microprocessor, the circuit comprising:

an input coupled to the microprocessor for receiving a power on signal therefrom;

an output coupled to the standby power input of the bus controlled IC;

a source of standby power; and means responsive to said power on signal for supplying standby power to said output whereby bus controlled I.C. standby power is enabled.

2. The circuit of claim 1, wherein said supplying means is an array of transistors.

3. In a bus type microprocessor controlled television set having associated infrared receiver and decoding circuitry coupled to the microprocessor and a bus controlled I.C., wherein standby power is constantly supplied to the microprocessor and infrared receiver and decoding circuitry in order to receive and act upon an "on TV" command from a remote infrared transmitter, a circuit for enabling the bus controlled IC comprising:

an input electrically coupled to the microprocessor;

an output electrically coupled to the bus controlled I.C.; and, at least one switching element electrically coupled to said input and to a power source sufficient to power the bus controlled I.C., wherein said switching element supplies power from said power source to said output to enable standby power of the bus controlled IC in response to receipt of an "on bus controlled I.C." command from the microprocessor via said input.

4. The circuit of claim 3, wherein said switching element is a pnp transistor.

5. The circuit of claim 1, wherein said bus controlled I.C. is a T-chip.

6. The circuit of claim 3, wherein said bus controlled I.C. is a T-chip.

* * * * *